Sept. 4, 1951  J. E. DICK  2,566,719
FISH BASKET

Filed Dec. 17, 1947  2 Sheets-Sheet 1

J. E. Dick
INVENTOR

BY C. A. Snowles.
ATTORNEYS.

Sept. 4, 1951 J. E. DICK 2,566,719
FISH BASKET
Filed Dec. 17, 1947 2 Sheets-Sheet 2
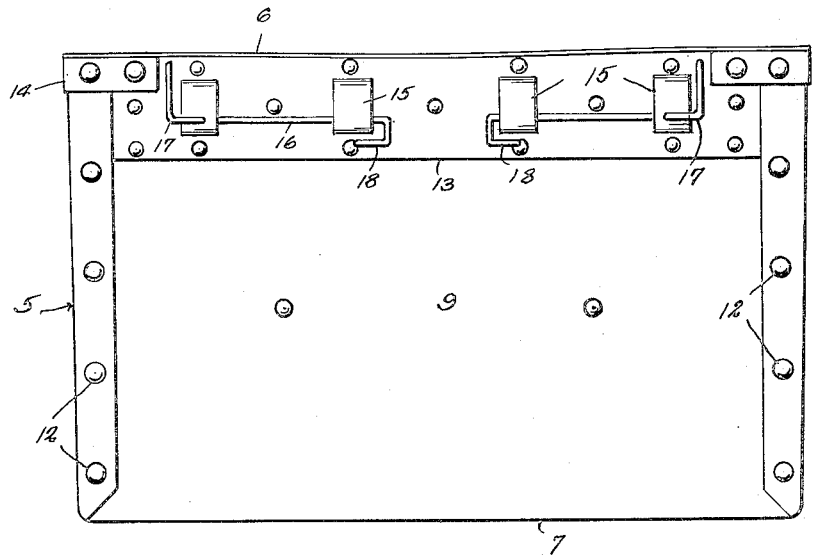
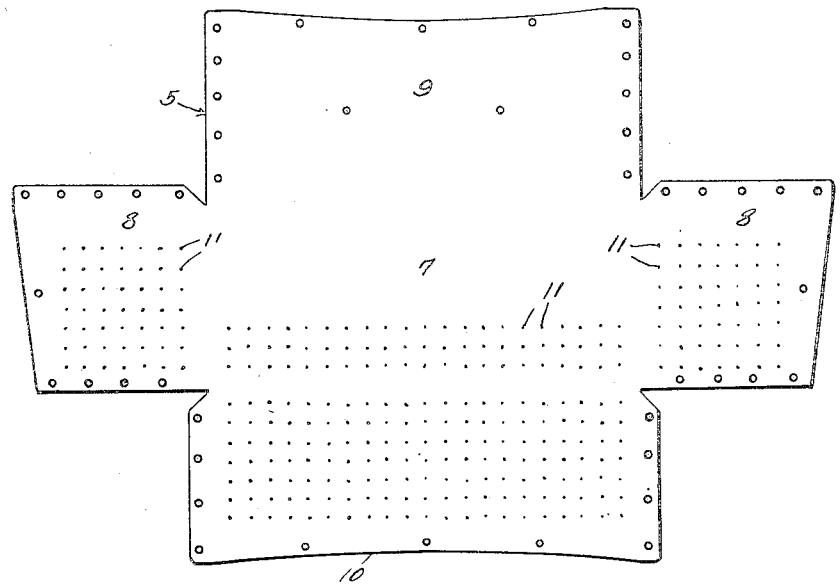
J. E. Dick
INVENTOR
BY
ATTORNEYS.

Patented Sept. 4, 1951

2,566,719

UNITED STATES PATENT OFFICE 2,566,719

FISH BASKET

James E. Dick, Alamosa, Colo.

Application December 17, 1947, Serial No. 792,259

1 Claim. (Cl. 224—5)

This invention relates to a fishing basket or creel, of a novel design and construction, that is adapted to be formed from such material as aluminum, stainless steel, or plastic.

It is well known among fishermen that the conventional basket, which is made of wicker, has numerous disadvantages. Among the most important is the fact that the conventional basket is exceedingly unsanitary. Over a long period of time, the conventional basket becomes quite dirty, and is inevitably bound to have a highly disagreeable and usually permanent odor. The innumerable crevices inherent in a wicker construction, as will be recognized, provide an unlimited repository for foreign material and organisms. Yet, washing or boiling of the basket is of little value, and is not only unsatisfactory in accomplishing removal of the foreign matter embedded in the crevices, but additionally, may in time have a destructive effect on the construction.

It is an important object of the invention, therefore, to provide a fishing basket which is readily fabricated from such material as aluminum, stainless steel, plastic, or the like, so that the basket is practically indestructible, and can be retained in a fully sanitary condition. As will be seen, the basket is rust-proof, and after each use, can simply be thrown under hot water, or boiled, the washing of the basket being possible as often as desired throughout the life thereof, without having any ill effects on the article.

Further important objects of the invention are to provide a basket of the character described which can be readily constructed by a stamping process, will be unusually light, will retain the fish in such a manner that they will be aerated and in a cooler condition, that can be worn on the hip or with a shoulder strap, and will be unusually comfortable.

Other important objects are to provide a basket which will be fly-proof, can be opened with one hand, and has means for supporting within it a tackle box or the like.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings

Figure 3 is a rear elevational view.

Figure 4 is a plan view of the blank from which the body of the basket is formed.

Figure 1:
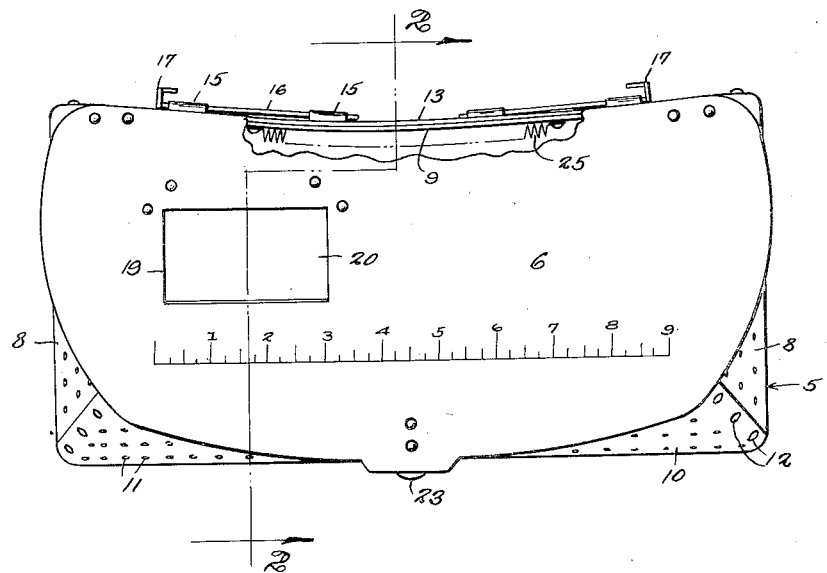
Figure 1 is a top plan view of a fishing basket constructed in accordance with the invention, a portion of the lid being broken away.
Figure 2:
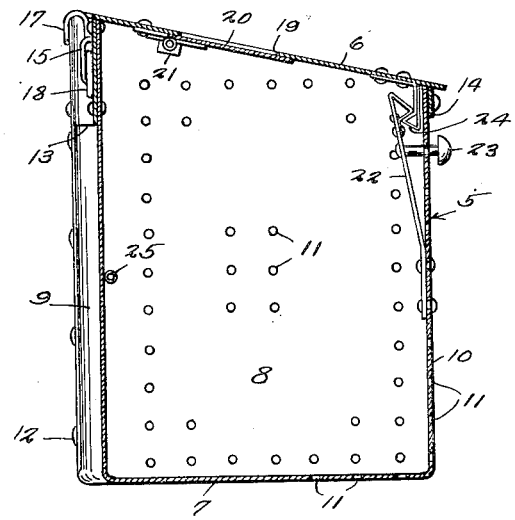
Figure 2 is a transverse section taken substantially on line 2—2 of Figure 1.

Referring to the drawings in detail, 5 designates the body generally, to which is hinged a lid 6. Reference should now be had to Figure 4, wherein it is illustrated a blank from which the body can conveniently be formed. It may be noted that the blank is in one piece, and preferably, a sheet of aluminum, stainless steel, or other material of long life and rust-resistant qualities is used. Aluminum is probably preferable, since it is unusually light, and additionally, has the quality of reflecting sunlight, thereby to keep fish contained within the basket much cooler than is the case with conventional wicker baskets. I believe, however, that a material such as plastic could also be used.

The blank is stamped or otherwise formed to define a bottom 7 at the center thereof, ends 8, and a back and front designated 9 and 10 respectively. At the time it is stamped, there can be also stamped therein perforations 11, or these can be formed in the blank later as desired.

Preferably, the perforations 11 cover substantially the whole area of the respective ends 8, and of the front 10. As to the bottom 7, the rear portion thereof, as clearly shown in Figure 4, is preferably left imperforate, so that water dripping out of the basket will be prevented, substantially, from dropping on the wearer.

The perforations 11, as will be recognized, provide for full aeration of the fish contained within the basket, so as to keep the fish as fresh as possible, and at the same time, it may be noted that the use of aluminum or similar material results in reflection of the sun, so that the interior of the basket remains much cooler than is common with conventional wicker creels. The perforations, of course, are sufficiently small as to prevent flies from entering the basket.

In the illustrated example, the body is readily formed from the blank, by turning up the wings of the blank. Then, the overlapping side edges of the ends, front, and back, are permanently and tightly joined, as by means of rivets 12. Obviously, instead of rivets, some process such as spot-welding or the like could be used, as desired.

The blank should be so formed that when the wings thereof are raised for the purpose of forming the body 5, the back 9 will be curvingly depressed longitudinally of the basket, as best shown in Figure 1. As a result of this construction, the basket curves conformably to the wearer's hip, thus adding materially to wearing comfort.

Reference should now be had to Figure 3, wherein it is seen that an elongated plate 13 is riveted or otherwise suitably joined to the back 9. After the plate is so secured, the basic construction of the body 5 can be completed by riveting to the top edge thereof an encircling band 14 the ends of which lap the ends of the plate 13.

Formed at spaced intervals in the plate 13 is a plurality of outstruck loops 15, these being preferably arranged into pairs as illustrated. Carried by the respective pairs of loops 15 are rods 16, which as can be seen, are permitted limited slidable movement within the retaining loops. Each rod is formed at its outer end with a hook 17, which is so shaped as to permit its entry into grommets of a web belt (not shown), or to permit their being hooked over a conventional belt. Additionally, a shoulder strap (not shown) can be readily threaded through the loops 15 by detaching the rods 16.

The rods 16 are also formed with inturned inner ends 18, so as to prevent disengagement of the rods from the loops.

Considering the detailed construction of the rods 16, it may be noted that the attaching hooks 17 formed on one end thereof comprise inverted U-shaped extensions of the rods extending laterally from the rods and having free ends disposed parallel to the rods. On the other ends, the rods are formed with retaining hooks 18 also of U-shape, and also extended laterally from the rods, but in a direction different from that of the attaching hooks 17, thus to effectively retain the rods against accidental disengagement from the loops 15 while at the same time positioning the upstanding attaching hook 17 in a manner to permit its ready attachment to a belt or shoulder strap.

The basket is thus made readily detachable so far as any type of conventional belt is concerned, and can also be worn over the shoulder if desired. Most usually, fishermen prefer to wear a basket on the hip, so as not to interfere with the fishing, and it is seen that the basket constructed in accordance with the invention can readily be attached or detached at any point on a belt.

The lid 6 is formed with a rectangular opening 19, which is normally closed by a cover plate 20. The cover plate 20 is hinged to the lid by means of a spring hinge 21, which normally presses the plate tightly against the opening 19, and thus constitutes a positive means of denying entry to flies or other insects. However, when it is desired to place a fish within the basket, the cover plate readily yields to the touch of the finger, and springs shut of its own accord after the fish has been deposited within the basket.

Embodied in the invention is a means for retaining the lid 6 in closed position, and I prefer to provide for this purpose a spring catch 22 attached to the inside of the basket, which can be made responsive to the pressing of a button 23. Normally, the spring catch 22 mounted on the inside of the body 5 is in engagement with a keeper 24 mounted on lid 6. However, to raise the lid, it is necessary only to depress the button 23, whereupon the lid 6 can be raised conveniently with one hand, a matter of considerable importance during fishing operations. The catch, as will be seen, normally retains the lid, however, in tightly closed position relative to the body 5, thereby further aiding in making the basket insect-proof.

To the inner surface of the back 9, I prefer to attach the ends of a spring 25, and this serves to retain efficiently a tackle box or similar article. The tackle box can thus be placed in position behind the spring with complete ease and can be removed with equal ease.

Additionally, it is preferred that the lid 6, which of course would also be formed from a stamping of aluminum or similar material, be provided with inch markings, as shown in Figure 1, so that a fish which has been caught can simply be placed against the lid, and readily measured to determine if it is of legal size. These markings can conveniently be stamped directly into the lid if desired.

It is not believed necessary to dwell at length on the advantages of the fish basket, as compared to baskets of conventional construction, and by referring back to the objects set forth hereinbefore, it will be seen that the invention fully meets the several stated purposes thereof, so that an unusually sanitary, exceptionally light, and very durable basket is provided, the versatility of which, as compared to a basket of conventional construction, becomes clearly apparent.

What is claimed is:

A metal creel construction including a body of perforated sheet metal material; a back plate rigidly secured to and overlying the upper portion of the rear wall of the body; spaced pairs of loops outstruck from the material of the body portion; rods mounted in said loops for limited slidable movement; attaching hooks on one end of the rods, said attaching hooks being formed as upstanding, inverted, U-shaped lateral extensions of the rods, said hooks having free ends extending parallel to said rods; and retaining hooks on the other ends of the rods and formed as U-shaped extensions extending laterally from the rods in a direction different from that in which the attaching hooks are laterally extended therefrom.

JAMES E. DICK.

REFERENCES CITED

The following references are of record in the file of this patent:

UNITED STATES PATENTS

| Number | Name | Date |
|--------|------|------|
| 506,909 | Greaves | Oct. 17, 1893 |
| 1,388,187 | Marble | Aug. 23, 1921 |
| 1,489,255 | Lane | Apr. 8, 1924 |
| 1,617,994 | Eaton | Feb. 15, 1927 |
| 1,625,920 | Thurman | Apr. 26, 1927 |